United States Patent
Li

(10) Patent No.: US 10,789,356 B2
(45) Date of Patent: Sep. 29, 2020

(54) METHOD, APPARATUS, AND SYSTEM FOR SERVICE DATA PROCESSING AND VERIFICATION

(71) Applicant: Alibaba Group Holding Limited, George Town (KY)

(72) Inventor: Yi Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/432,572

(22) Filed: Jun. 5, 2019

(65) Prior Publication Data

US 2019/0311116 A1 Oct. 10, 2019

Related U.S. Application Data

(63) Continuation of application No. PCT/CN2017/113349, filed on Nov. 28, 2017.

(30) Foreign Application Priority Data

Dec. 6, 2016 (CN) .......................... 2016 1 1107046

(51) Int. Cl.
*G06F 21/64* (2013.01)
*G06F 21/55* (2013.01)
(Continued)

(52) U.S. Cl.
CPC .......... *G06F 21/55* (2013.01); *G06F 21/6218* (2013.01); *G06F 21/64* (2013.01); *G06Q 20/389* (2013.01)

(58) Field of Classification Search
CPC ... G06F 21/6218; G06F 21/64; H04L 9/3236; H04L 9/3239; G06Q 20/389
See application file for complete search history.

(56) References Cited

U.S. PATENT DOCUMENTS

2016/0260095 A1 9/2016 Ford
2016/0283920 A1 9/2016 Fisher et al.
(Continued)

FOREIGN PATENT DOCUMENTS

CN 101409614 4/2009
CN 105610578 5/2016
(Continued)

OTHER PUBLICATIONS

Blockchain Technology—A game-changer in accounting?, Deloitte, Mar. 2016.*

(Continued)

*Primary Examiner* — Minh Dinh
(74) *Attorney, Agent, or Firm* — Fish & Richardson P.C.

(57) ABSTRACT

Techniques for detecting data tampering are described. One example method includes identifying particular data associated with a service system; generating fingerprint data as a result of executing a fingerprint function on the particular data; storing the fingerprint data in a blockchain maintained by a blockchain network; storing the particular data in a storage device in the service system; after storing the fingerprint data to the blockchain and storing the particular data in the storage device: identifying a request to verify that the particular data stored in the storage device has not been modified since it was stored; generating verification fingerprint data as a result of executing the fingerprint function on the particular data stored in the storage device; determining that the verification fingerprint data matches the fingerprint data stored; and in response, determining that the particular data stored in the storage device has not been modified since it was stored.

17 Claims, 13 Drawing Sheets

(51) Int. Cl.
*G06F 21/62* (2013.01)
*G06Q 20/38* (2012.01)

(56) References Cited

U.S. PATENT DOCUMENTS

| | | | |
|---|---|---|---|
| 2016/0292672 A1 | 10/2016 | Fay et al. | |
| 2016/0300234 A1 | 10/2016 | Moss-Pultz et al. | |
| 2016/0323151 A1* | 11/2016 | Nahata | H04L 41/147 |
| 2016/0342977 A1 | 11/2016 | Lam | |
| 2017/0148016 A1* | 5/2017 | Davis | G06Q 20/3827 |
| 2017/0364552 A1* | 12/2017 | Pattanaik | H04L 9/3297 |
| 2018/0075532 A1* | 3/2018 | Chenard | G06Q 20/381 |
| 2018/0091524 A1* | 3/2018 | Setty | H04L 63/12 |
| 2018/0247302 A1* | 8/2018 | Armstrong | G06Q 20/3827 |
| 2018/0268386 A1* | 9/2018 | Wack | G06Q 20/102 |

FOREIGN PATENT DOCUMENTS

| | | |
|---|---|---|
| CN | 105678182 | 6/2016 |
| CN | 105719185 | 6/2016 |
| CN | 105871545 | 8/2016 |
| CN | 105956923 | 9/2016 |
| CN | 105975868 | 9/2016 |
| CN | 106027563 | 10/2016 |
| CN | 106097030 | 11/2016 |
| CN | 106100847 | 11/2016 |
| CN | 107016542 | 8/2017 |
| JP | 2010258993 | 11/2010 |
| TW | I449395 | 8/2014 |
| WO | WO 2017091305 | 6/2017 |

OTHER PUBLICATIONS

PCT International Preliminary Report on Patentability in International Application No. PCT/CN2017/113349, dated Jun. 11, 2019, 10 pages (with English Translation).
PCT International Search Report and Written Opinion in Internaitonal Application No. PCT/CN2017/113349, dated Feb. 26, 2018, 14 pages (with English Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Deloitte, [online] "Blockchain Technology A game-changer in accounting?," Jun. 2016, retrieved on Dec. 4, 2019, retrieved from URL<https://www2.deloitte.com/content/dam/Deloitte/de/Documents/Innovation/Blockchain_A%20game-changer%20in%20accounting.pdf>, 5 pages.
Extended European Search Report in European Application No. 17879521.7, dated Dec. 4, 2019, 9 pages.

* cited by examiner

METHOD, APPARATUS, AND SYSTEM FOR SERVICE DATA PROCESSING AND VERIFICATION

CROSS-REFERENCE TO RELATED APPLICATIONS

This application is a continuation of PCT Application No. PCT/CN2017/113349, filed on Nov. 28, 2017, which claims priority to Chinese Patent Application No. 201611107046.9, filed on Dec. 6, 2016, and each application is hereby incorporated by reference in its entirety.

TECHNICAL FIELD

The present application relates to the field of computer data processing technologies, and in particular, to a method, an apparatus, and a system for service data processing and verification.

BACKGROUND

Security and reliability of service data play a very important role in ensuring normal processing of the service system data and output of a reliable result. Especially, with continuous development of Internet finance, current payment institutions usually construct their own core accounting systems to process fund transfer requests of users. However, how to ensure that service data in these similar core accounting systems is not tampered with and to improve credibility of data disclosed by the payment institutions is a problem that currently draws increasing attention of many financial enterprise users.

Sensitive accounting data in the service data is usually recorded in an accounting system database of the payment institution. Because the payment institution has the highest management authority for the database, the payment institution theoretically can randomly tamper with data in the database. The accounting data is directly associated with funds, and therefore the accounting data is usually a type of data with the highest importance in the payment institution. Therefore, the payment institution usually uses some technical methods to show the public that the accounting data of the payment institution is authentic and reliable, and cannot be tampered with once the accounting data is generated, to improve credibility of the payment institution. For example, it is confirmed that transfer of a donation is authentic and reliable in a charity donation scenario. For another example, it is confirmed that fund record data of a payment institution is not modified in a regulatory review scenario. An existing common method for determining reliability of the accounting data is usually to perform account checking. For example, in a method, verification can be performed using data of another institution or similar entity. For the same fund transfer, related participants can store accounting data from the perspectives of the related participants, and the accounting data is used to perform verification on the data of the payment institution. That is, whether the accounting data of the payment institution is tampered with is verified by presenting different data of the same fund transfer document. The accounting data and related data of another institution support each other, so that the accounting data and the related data can be supported by each other, to increase costs for forgery of the accounting data.

In the previous described and other existing methods, relatively high costs are needed for maintaining credibility of accounting data of an institution. For example, when verification is performed using data of another institution, usually at least three parties need to save different copies of the same service data, so that a party whose data is forged can be determined. Furthermore, there is a relatively high requirement on security of software or hardware for data transmission and storage. In addition, it is inappropriate to disclose some sensitive data for some payment institutions. Therefore, in a process of monitoring and processing accounting data, the original accounting data or a processing procedure is largely changed and modified, affecting the original processing procedure and performance of a system for the accounting data. Furthermore, a trust problem cannot be fundamentally resolved in the method. For example, an external institution can be an institution associated with the payment institution, and the external institution and the payment institution can make forgery together.

Therefore, currently a problem that the accounting data is modified cannot be fundamentally resolved in terms of the accounting data in some existing monitoring methods used by the payment institution to ensure authenticity and reliability of the accounting data of the payment institution, thereby reducing reliability of data disclosed by the payment institution.

SUMMARY

The present application is intended to provide a method, an apparatus, and a system for service data processing and verification, so that on the premise that impact on an original processing procedure and performance is relatively small, a copy of original service data is stored by embedding the original service data in fingerprint data and writing the fingerprint data to a blockchain. As such, whether the service data is tampered with can be verified, and it can be ensured that the service data cannot be modified, thereby improving reliability and credibility of the service data.

The method, apparatus, and system for service data processing and verification provided in the present application are implemented as follows:

A method for service data processing is provided, and the method includes: obtaining service data that is to be processed, and generating, by using a predetermined method, fingerprint data of the service data that is to be processed; and writing the fingerprint data to a blockchain corresponding to the service data that is to be processed, and generating blockchain copy data of the service data that is to be processed in the blockchain, where the blockchain copy data stores fingerprint data in blockchain copy data of a previous adjacent node.

An apparatus for service data processing is provided, and the apparatus includes: a fingerprint data generation module, configured to obtain service data that is to be processed, and generate, by using a predetermined method, fingerprint data of the service data that is to be processed; and a blockchain data generation module, configured to write the fingerprint data to a blockchain corresponding to the service data that is to be processed, and generate blockchain copy data of the service data that is to be processed in the blockchain, where the blockchain copy data stores fingerprint data in blockchain copy data of a previous adjacent node.

A method for service data verification is provided, and the method includes: determining service data that is to be verified, and obtaining, from stored blockchain data, blockchain copy data associated with the service data that is to be verified, where the blockchain copy data includes data information that is generated based on fingerprint data of service data to be processed and that is stored in a blockchain, and the blockchain copy data stores fingerprint data in blockchain copy data of a previous adjacent node; calculating, by using a predetermined method, first fingerprint data of the service data that is to be verified, and obtaining second fingerprint data in the blockchain copy data that is corresponding to the service data that is to be verified; and determining, through comparison, whether the first fingerprint data is the same as the second fingerprint data, and determining that the service data that is to be verified is not modified if the first fingerprint data is the same as the second fingerprint data.

A service system is provided, and includes an I/O interface and a processing unit, where the I/O interface is configured to receive service data that is to be processed; and the processing unit is configured to generate, by using a predetermined method, fingerprint data of the service data that is to be processed; and is further configured to write the service data to an original database, write the fingerprint data to a blockchain database corresponding to the service data that is to be processed, and generate blockchain copy data of the service data that is to be processed in the blockchain, where the blockchain copy data stores fingerprint data in blockchain copy data of a previous adjacent node.

According to the method, apparatus, and system for service data processing and verification provided in the present application, a blockchain is used to store a copy of data in a conventional service database. In a processing procedure of an original service system, only fingerprint data corresponding to service data needs to be generated, and the fingerprint data is then stored in a corresponding blockchain to generate blockchain copy data. As such, the processing procedure of the original service system is slightly invaded, and while it is ensured that the conventional database has a high-performance capability, a monitoring effect of the service data is ensured, and the service data cannot be modified, thereby improving reliability and credibility of the service data, especially, sensitive accounting data.

BRIEF DESCRIPTION OF DRAWINGS

To describe the technical solutions in the implementations of the present application or in the existing technology more clearly, the following briefly describes the accompanying drawings needed for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 2:
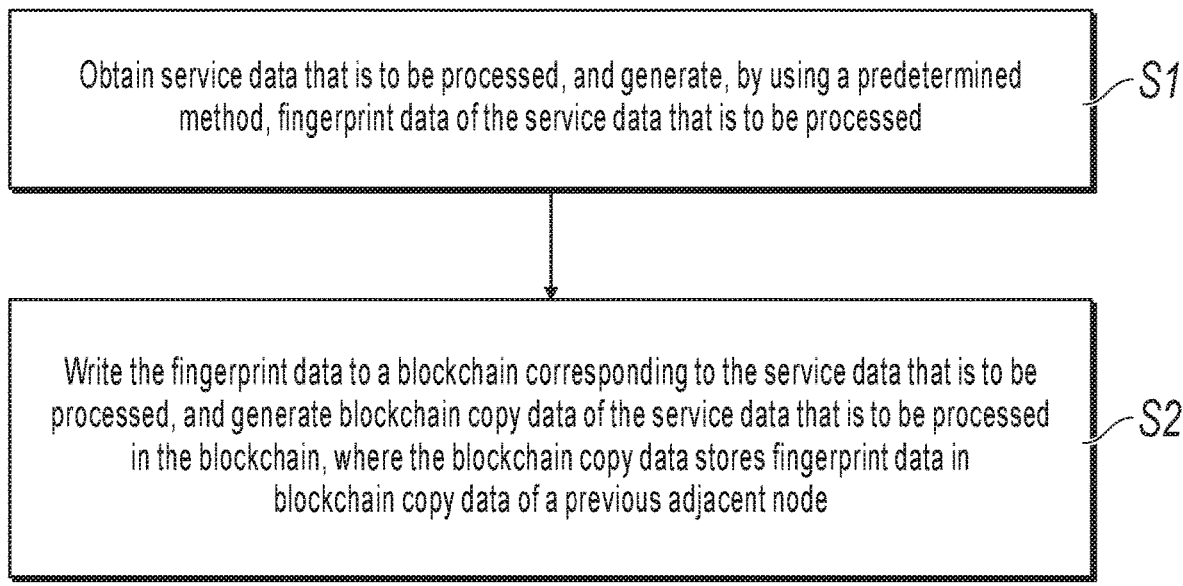
FIG. 2 is a method flowchart illustrating an implementation of a method for data processing, according to the present application.

FIG. 2 is a method flowchart illustrating an implementation of a method for service data processing, according to the present application. Although operation steps of a method or structures of an apparatus shown in the following implementations or the accompanying drawings are provided in the present application, the method or the apparatus can include more or fewer operation steps or module units based on conventional or noncreative efforts. An execution sequence of steps or module structures of the apparatus without a logical causal relationship are not limited to an execution sequence or module structures shown in the implementations of the present application or the accompanying drawings. When being applied to an actual apparatus or end-user device product, the method or the module structures can be performed sequentially or in parallel based on the method or the module structures shown in the implementations or the accompanying drawings (for example, in an environment of parallel processing or multithreaded processing, or even an implementation environment including distributed processing).

Figure 1:
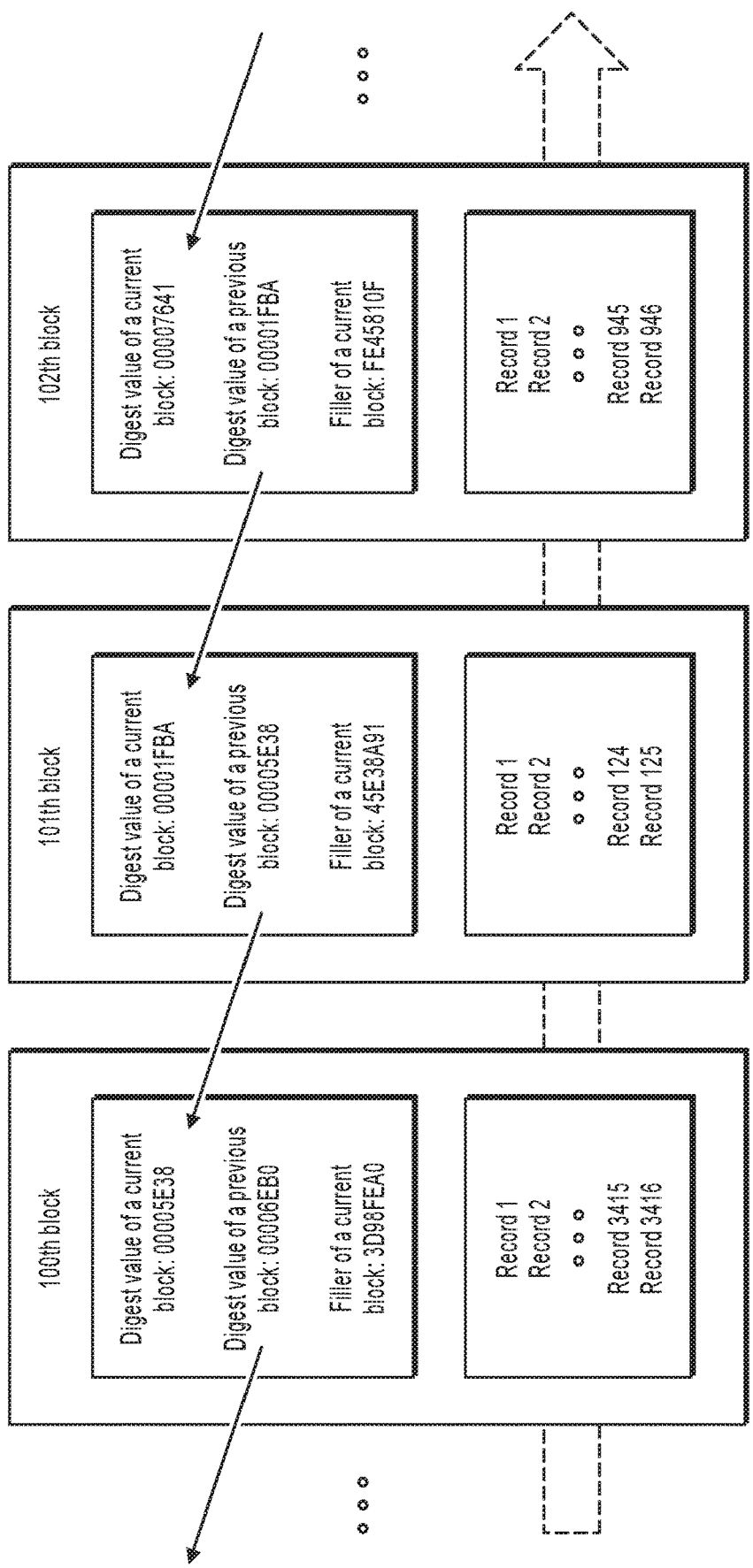
FIG. 1 is a schematic diagram illustrating a data structure for storing blockchain data, according to the present application.

A blockchain is a decentralized, trustless, and tamper-resistant distributed data storage technology. FIG. 1 is a schematic diagram illustrating a data structure for storing blockchain data, according to the present application. As shown in FIG. 1, a linked data structure of a blockchain ensures that data can be changed only by using an incremental method. Recorded data remains in a state it is when being created. In addition, the blockchain determines, by using a specific consensus algorithm, a node responsible for recording data of each block, and the node is agreed upon by one or more nodes. In a case of changing existing data, the data usually can be replaced only by forging the entire blockchain. This is almost impossible in a consensus algorithm for proof of work or a consensus algorithm for proof of stake. As such, in the solutions of the present application, a blockchain is used to store a copy of data in a conventional service database. In a processing procedure of an original service system, only fingerprint data corresponding to service data needs to be generated, and the fingerprint data is then stored in a corresponding blockchain to generate blockchain copy data. As such, the processing procedure is merely slightly changed, and while it is ensured that the conventional database has a high-performance capability, a monitoring effect of the service data is ensured, and the service data cannot be modified, thereby improving reliability and credibility of the service data.

For clarity, an application scenario in which an accounting system of a specific payment institution generates blockchain copy data of accounting data is used for description. Certainly, service data processed in the present implementation is accounting data. However, a person skilled in the art can understand that an essence spirit of the solutions can be applied to another scenario in which service data in a service system is prevented from being tampered with. That is, a fingerprint data generation logic is embedded in an original system processing procedure, and the fingerprint data is written to a blockchain, so that it can be determined, by comparing a fingerprint data value of current service data with an original fingerprint data value stored in the blockchain, whether the current service data is modified, and the possibility of tampering with the data is eliminated, thereby improving reliability and credibility of the service data. The service data in the implementation solutions of the present application is not limited to the accounting data, but there is a more obvious application effect on the sensitive accounting data. The solutions can significantly improve credibility of data disclosed by related financial service users such as a payment institution and enhance service use experience of a user who has an interest relationship with the accounting data.

A specific implementation is shown in FIG. 2. In an implementation of the method for service data processing provided in the present application, the method can include the following steps.

S1. Obtain service data that is to be processed, and generate, by using a predetermined method, fingerprint data of the service data that is to be processed.

A service system of a payment institution can obtain and store corresponding service data based on an accounting request of an accounting initiator. In an application scenario of the implementation of the present application, when an accounting system normally stores accounting data in a database, the accounting data can be obtained. The accounting data can be collectively referred to as service data that is to be processed here. The service data that is to be processed then can be processed by using the predetermined method, to generate the fingerprint data of the service data that is to be processed.

In the implementation, the payment institution can be understood as an institution that provides some or all currency fund transfer services and that serves as an intermediary institution between a payer and a payee. The service data can include fund change credential data generated in a system database when the payment institution provides a fund transfer and record service, or can include fund change credential data or associated data that is directly obtained from the accounting initiator and that is generated in fund transfer and record. For example, the service data that is to be processed can be billing data received from the service system.

In an application scenario of the implementation, fingerprint data can be defined for the accounting data based on an implementation scenario, a service type, etc. of the accounting data, and one piece of accounting data can be uniquely determined by using the fingerprint data. If the accounting data is tampered with, the generated fingerprint data of the accounting data is also changed. As such, authenticity of certain accounting data can be determined by comparing fingerprint data of the accounting data.

To protect sensitive data in the original service data, in another implementation of the method in the present application, a predetermined algorithm can be selected, which may include an algorithm in which generated fingerprint data cannot be reversely obtained. In an implementation provided in the present application, a process of generating the fingerprint data is set to be unidirectional and irreversible.

In the solution provided in the implementation, the process of generating the fingerprint data is unidirectional and irreversible. As such, in the implementation, the fingerprint data of the data can be easily obtained by using the data, but the data cannot be deduced by using the fingerprint data. Therefore, the method provided in the implementation can effectively and reliably ensure data security and privacy protection.

An algorithm used for generating the fingerprint data of the service data that is to be processed can be selected or customized based on a service scenario or a service data processing demand, and the service data that is to be processed is converted into identification information that can uniquely determine the service data that is to be processed. The predetermined algorithm for generating the fingerprint data usually can include a plurality of methods. The predetermined method in an implementation in the present application can be performing data hash processing, namely, hash (Hash) processing, on the service data that is to be processed, and a generated hash value can be used as the fingerprint data of the service data that is to be processed in the present implementation. Therefore, in an implementation of the method for service data processing provided in the present application, the generating, by using a predetermined method, fingerprint data of the service data that is to be processed can include the following step:

S101. Perform hash processing on the service data that is to be processed, and use a hash value generated through the hash processing as the fingerprint data of the service data that is to be processed.

Figure 3:
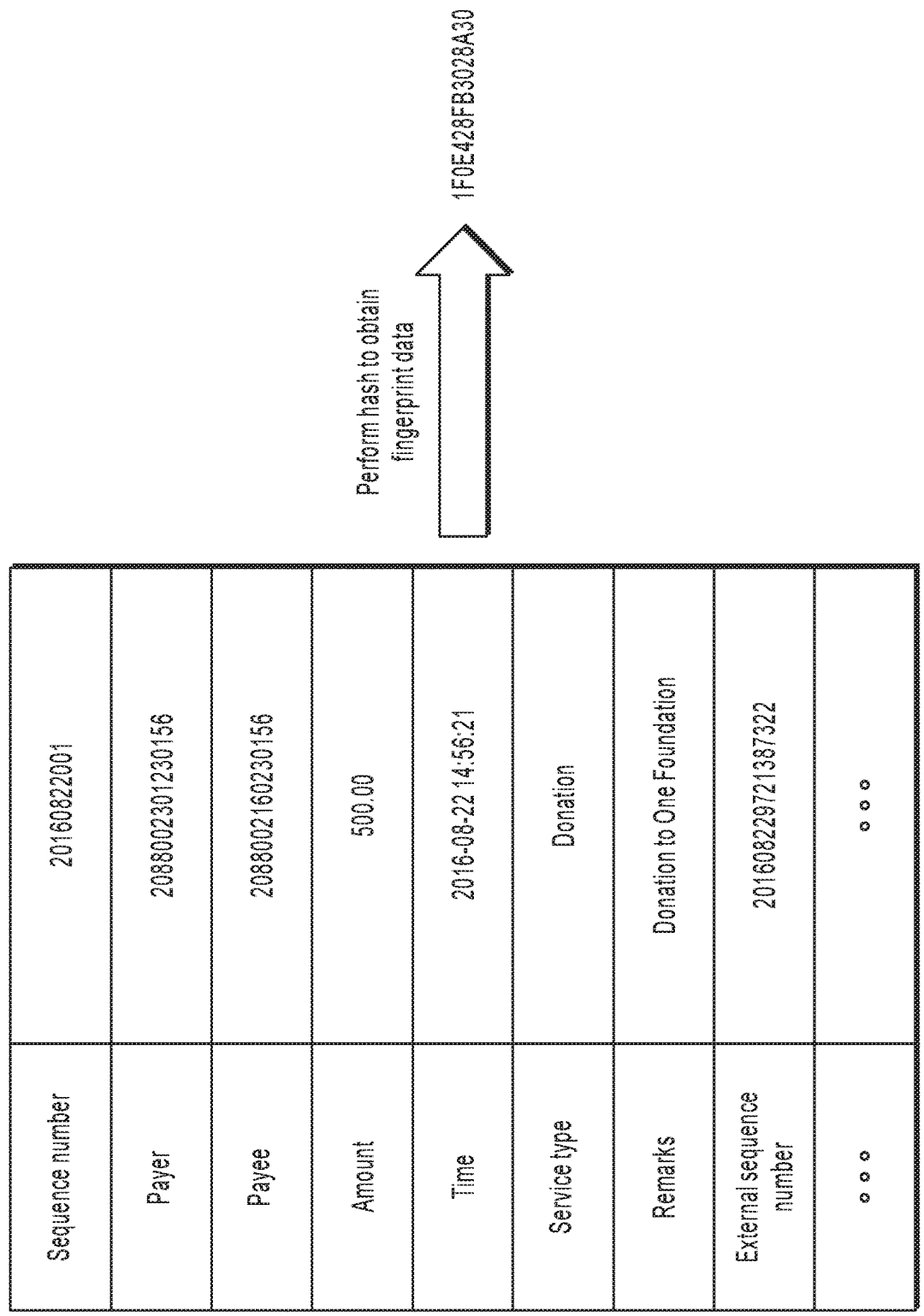
FIG. 3 is a schematic diagram illustrating an implementation scenario of generating fingerprint data of service data that is to be processed, according to the present application.

In information security technologies, a hash (Hash) function can provide a message integrity verification service, and can generate output of a fixed length for input messages of different lengths. The output of the fixed length is referred to as a "hash" or a "message digest" (Message digest) of the original input message. FIG. 3 is a schematic diagram illustrating an implementation scenario of generating fingerprint data of service data that is to be processed, according to the present application. A specific hash method can be customized, or can be MD5, SHA-1, or another algorithm. In the implementation of the present application, the hash value of the service data that is to be processed can be used as the fingerprint data of the service data that is to be processed, to improve security of the original service data and privacy.

S2. Write the fingerprint data to a blockchain corresponding to the service data that is to be processed, and generate blockchain copy data of the service data that is to be processed in the blockchain, where the blockchain copy data stores fingerprint data in blockchain copy data of a previous adjacent node.

In the existing service system of the payment institution, when the accounting data is stored, the fingerprint data of the accounting data can be calculated by using the previous method, and then the fingerprint data can be written to the blockchain. The fingerprint data can be stored in a corresponding data storage unit, for example, a database or another storage medium that is dedicated for storing data in a public blockchain. As such, it is equivalent to that there are different versions of the same accounting data in both the existing database and the blockchain, and the two versions are anchored to and associated with each other to determine whether the original accounting data in the database is tampered with.

A linked data structure of the blockchain ensures that data can be changed only by using an incremental method. The blockchain copy data of the service data that is recorded in the blockchain remains in a state it is when being created. In addition, the blockchain determines, by using a specific consensus algorithm (for example, the blockchain copy data includes the fingerprint data in the blockchain copy data of the previous adjacent node), a node responsible for recording data of each block, and the node is agreed upon by one or more nodes. In a case of changing existing data, the data usually can be replaced only by forging the entire blockchain. Currently, in a case of full disclosure to the outside (or full disclosure to a specified monitored object), it is almost impossible to replace data in the entire blockchain. Therefore, in the present application, a feature that the fingerprint data in the blockchain cannot be tampered with can be used to determine, in an associated way, whether the original accounting data in the database is tampered with, improving credibility of the accounting data.

Figure 4:
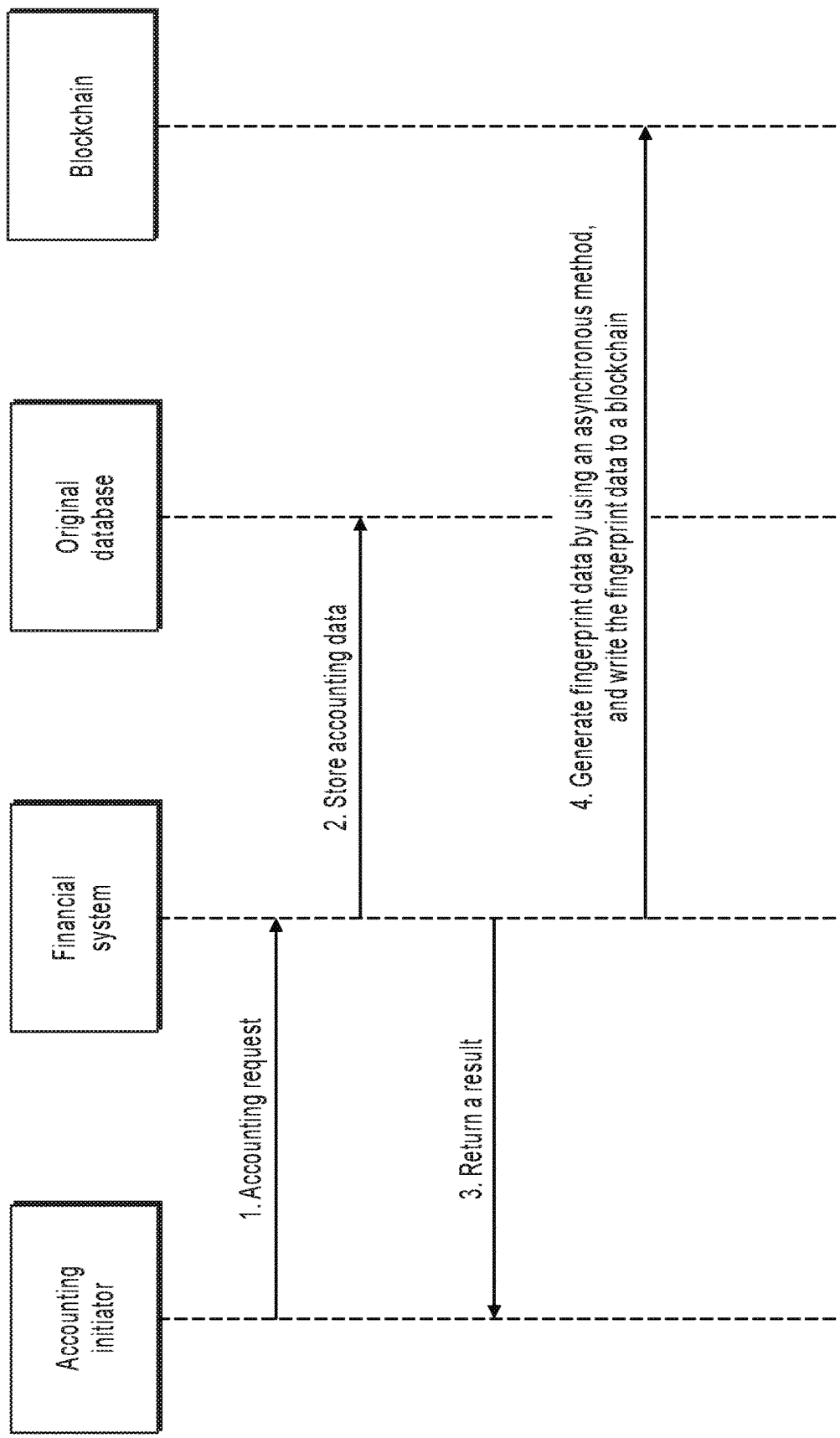
FIG. 4 is a schematic diagram illustrating implementation of another implementation scenario of a method for service data processing, according to the present application.

In some implementations of the present application, the fingerprint data can be stored when the service data is stored in the database, and the fingerprint data is written to the blockchain. In another implementation, to further reduce impact on the original service system and improve processing performance of the original service system, after the service data that is to be processed is stored in the database, the service data that is to be processed can be written into the blockchain by using an asynchronous method (in other words, the service data is written to both the database and the blockchain). An overall service system processing procedure is shown in FIG. 4. FIG. 4 is a schematic diagram illustrating implementation of another implementation scenario of a method for service data processing, according to the present application. In other words, accounting data in FIG. 4 is a specific application scenario of the service data in the implementation of the present application. Therefore, in another implementation of the method for service data processing provided in the present application, the writing the fingerprint data to a blockchain corresponding to the service data that is to be processed includes the following step:

S102. Write, by using an asynchronous method, the fingerprint data to the blockchain corresponding to the service data that is to be processed.

As such, the impact on the original service system can be further reduced, and the processing performance of the original service system can be improved.

According to the method for service data processing provided in the present application, a blockchain is used to store a copy of data in a conventional service database. In a processing procedure of an original service system, only fingerprint data corresponding to service data needs to be generated, and the fingerprint data is then stored in a corresponding blockchain to generate blockchain copy data. As such, the processing procedure of the original service system is slightly invaded, and while it is ensured that the conventional database has a high-performance capability, a monitoring effect of the service data is ensured, and the service data cannot be modified, thereby improving reliability and credibility of the service data.

Figure 5:
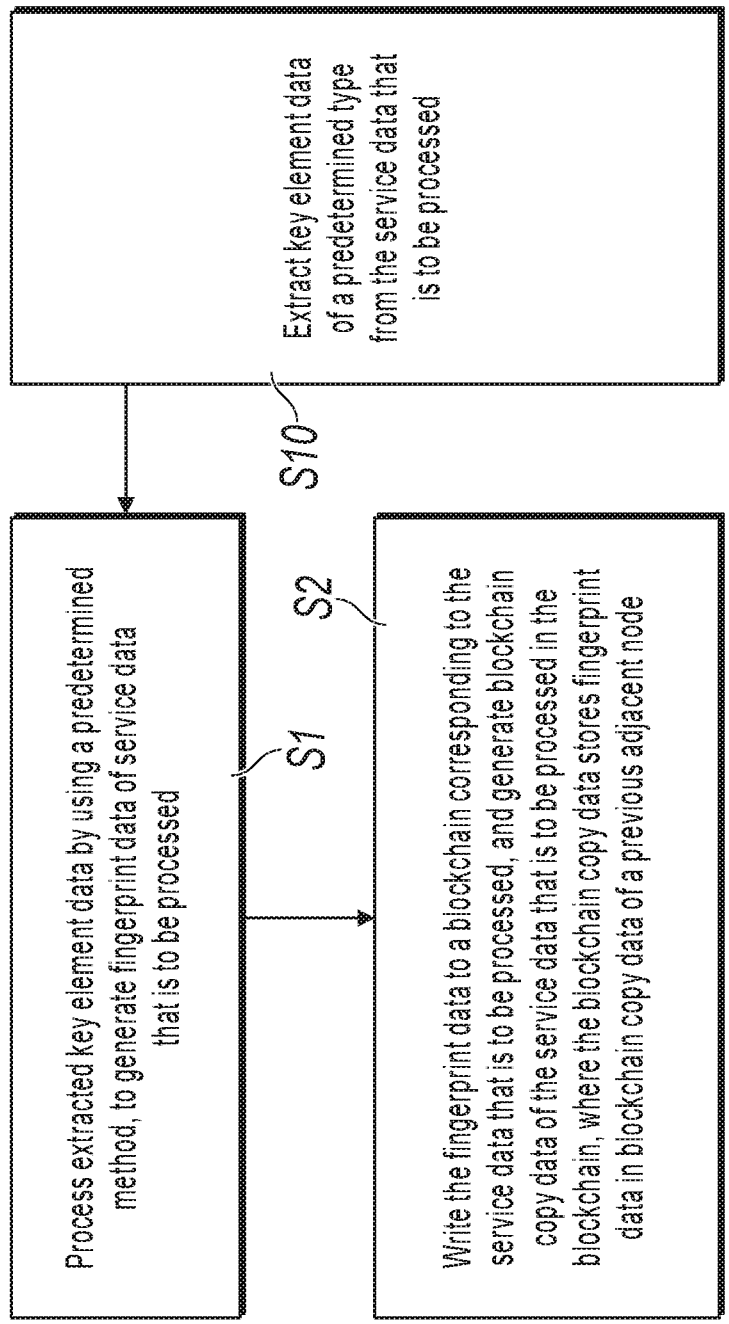
FIG. 5 is a schematic method flowchart illustrating another implementation of a method for service data processing, according to the present application.

FIG. 5 is a schematic method flowchart illustrating another implementation of a method for service data processing, according to the present application. As shown in FIG. 5, when the service data that is to be processed is generated, determined key elements such as IDs of two transfer parties, time, and an amount in the service data that is to be processed can be first extracted, and then the fingerprint data is generated for the key element data. As such, common key element data can be extracted from a plurality of different types of service data. Therefore, source data of fingerprint data is simplified, and the fingerprint data is quickly generated, improving a data processing effect. In another implementation of the method for service data processing provided in the present application, the method can further include the following step:

S10. Extract key element data of a predetermined type from the service data that is to be processed. Correspondingly, the generating, by using a predetermined method, fingerprint data of the service data that is to be processed includes the following: processing the extracted key element data by using the predetermined method, to generate the fingerprint data of the service data that is to be processed.

Figure 6:
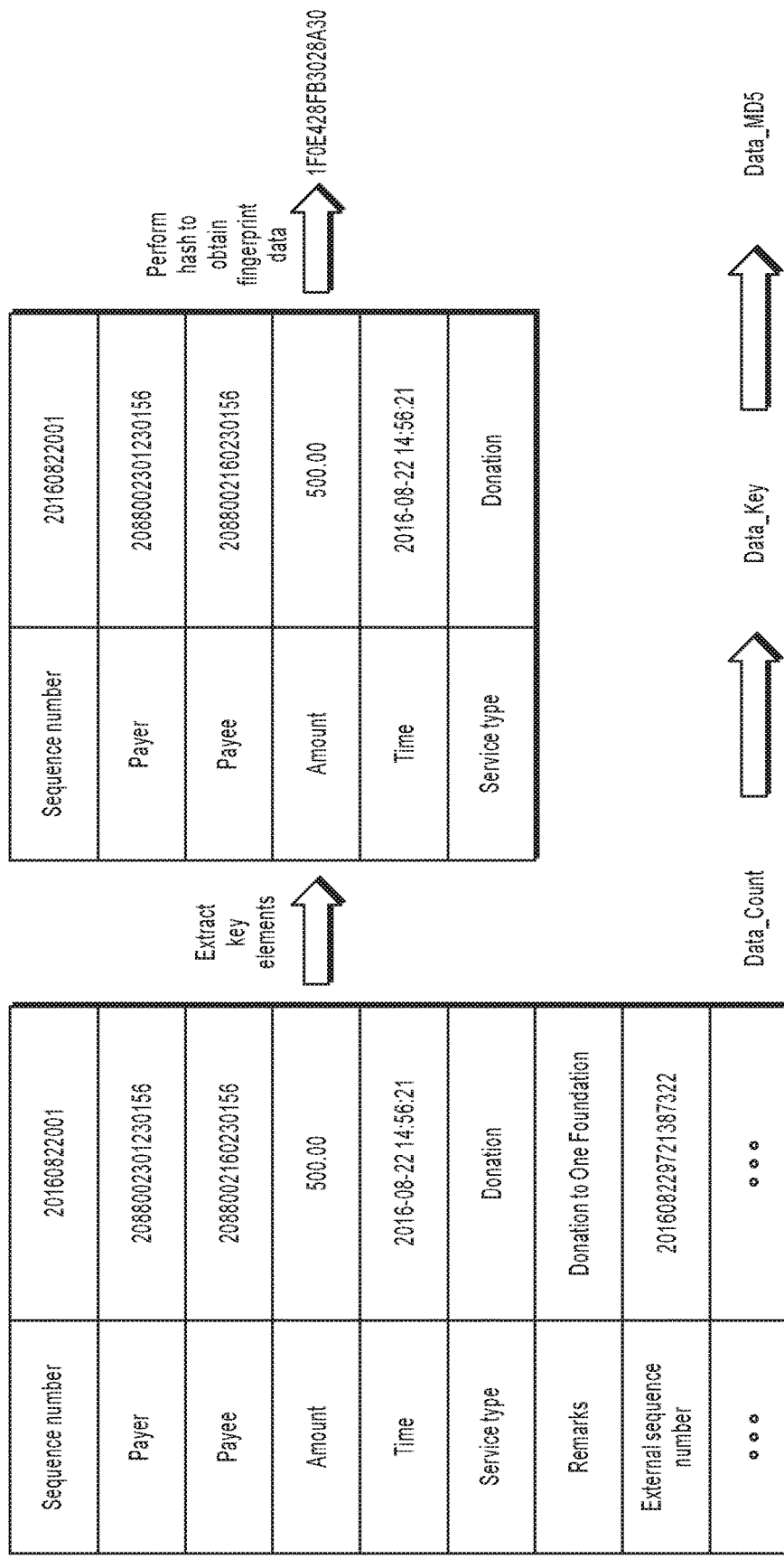
FIG. 6 is a schematic diagram illustrating another implementation scenario of generating fingerprint data of service data that is to be processed, according to the present application.

FIG. 6 is a schematic diagram illustrating another implementation scenario of generating fingerprint data of service data that is to be processed, according to the present application. As shown in FIG. 6, key element data Data_Key, such as two transfer parties, time, an amount, a service document number, and a service type in an accounting data model Data_Count can be extracted, and then fingerprint data Data_MD5 is generated for these key elements.

In some other implementations, when at least one piece of the key element data is absent from the service data that is to be processed, the method can include the following step:

S11. Determine a default value of the key element data that is absent based on a service type of the service data, and use the default value as a value of the key element data for generating the fingerprint data.

Figure 7:
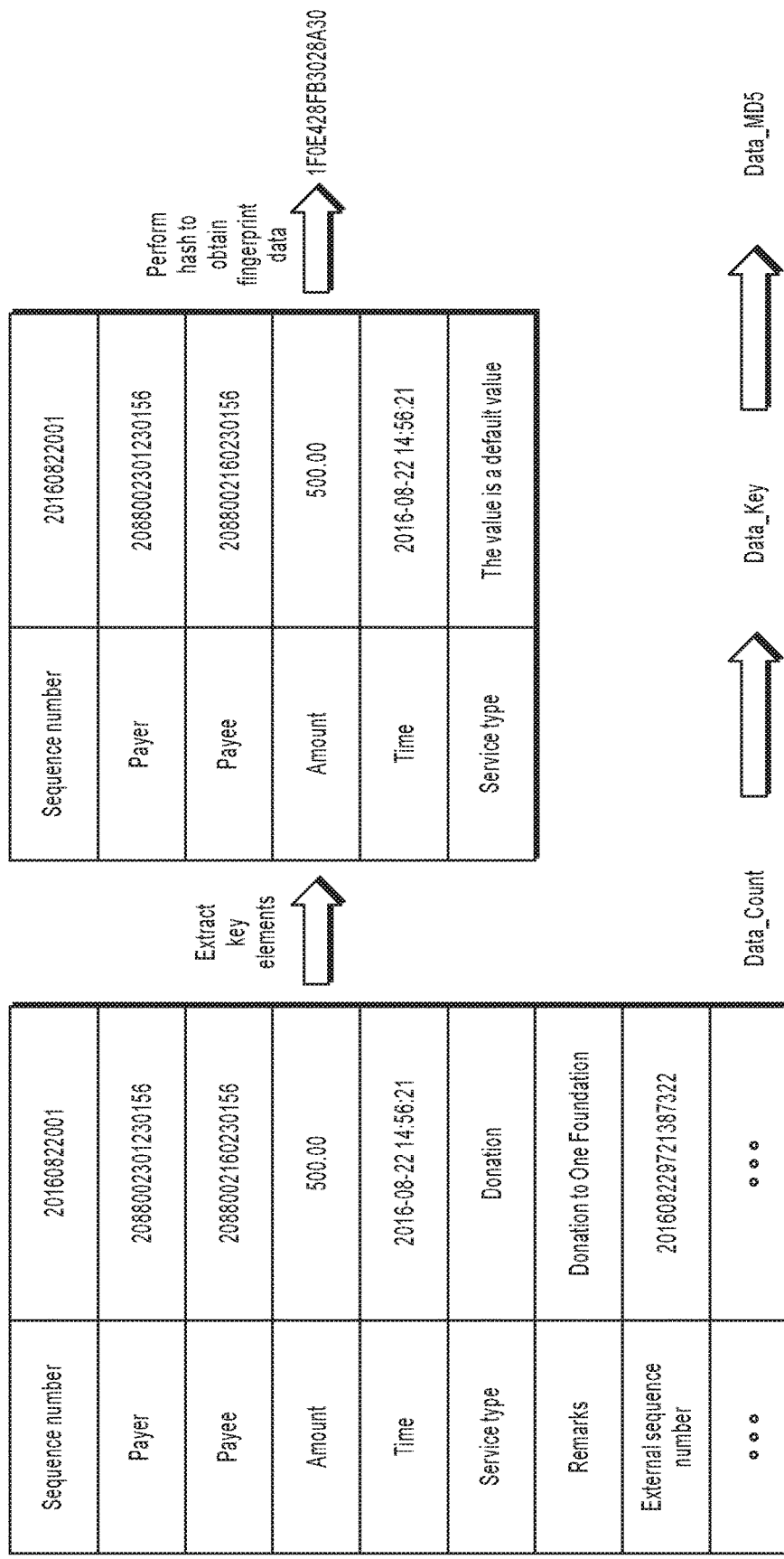
FIG. 7 is a schematic diagram illustrating another implementation scenario of generating fingerprint data of service data that is to be processed, according to the present application.

In a specific application scenario, for example, when a quantity of pieces of the key element data that is absent is less than a predetermined quantity (for example, two), the fingerprint data of the service data that is to be processed can be generated by using the key element data extracted from the service data that is to be processed and the default value of the key element data that is absent. For example, FIG. 7 is a schematic diagram illustrating another implementation scenario of generating fingerprint data of service data that is to be processed, according to the present application. When the key element data of the service type is absent, the default service type, namely, "the value is a default value", can be used as a default value of the service type, and then the fingerprint data Data_MD5 of the service data that is to be processed is generated with reference to the obtained key element data such as a sequence number, a payee, a payer, the amount, and the time.

Figure 8:
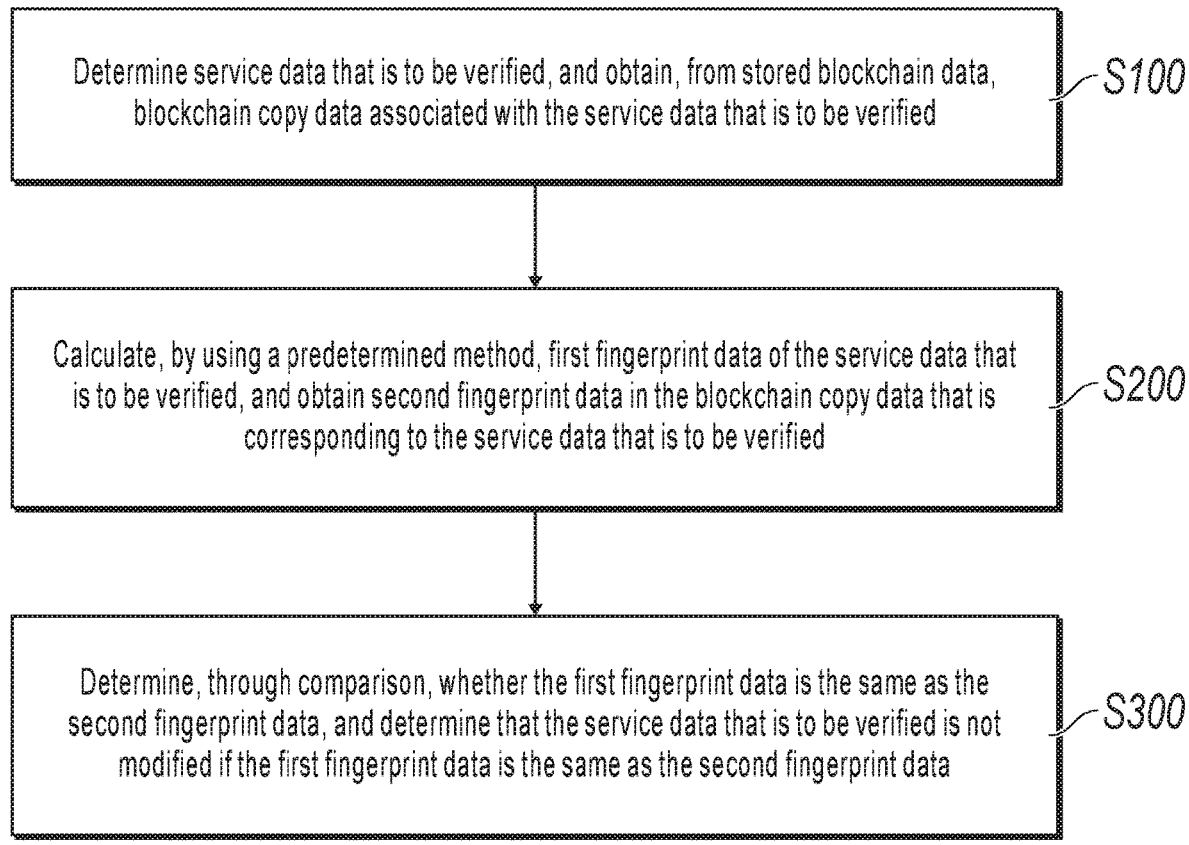
FIG. 8 is a method flowchart illustrating an implementation of a method for service data verification, according to the present application.

According to the method for service data processing provided in the implementation of the present application, there can be different versions of the same document in both an existing database and a blockchain, and the two versions are anchored to each other. Data in the blockchain can be disclosed, or disclosed to a specified object such as a regulatory authority or a specified user, to verify whether service data stored in the database is tampered with, and improve credibility of the service data. Therefore, based on the previous description, the present application further provides a method for service data verification. FIG. 8 is a method flowchart illustrating an implementation of a method for service data verification, according to the present application. As shown in FIG. 8, the method can include the following steps.

S100. Determine service data that is to be verified, and obtain, from stored blockchain data, blockchain copy data associated with the service data that is to be verified, where the blockchain copy data includes data information that is generated based on fingerprint data of service data to be processed and that is stored in a blockchain, and the blockchain copy data stores fingerprint data in blockchain copy data of a previous adjacent node.

S200. Calculate, by using a predetermined method, first fingerprint data of the service data that is to be verified, and obtain second fingerprint data in the blockchain copy data that is corresponding to the service that is to be verified.

S300. Determine, through comparison, whether the first fingerprint data is the same as the second fingerprint data, and determine that the service data that is to be verified is not modified if the first fingerprint data is the same as the second fingerprint data.

As such, in the solution provided in the implementation of the present application, a feature that fingerprint data in a blockchain cannot be tampered with can be used to determine, in an associated way, whether data in a database is tampered with, and service data in a service system of a payment institution is tampered with can be effectively and reliably verified, and the possibility that the service data (especially accounting data) is forged is fundamentally eliminated in terms of technology, thereby improving credibility of the accounting data disclosed by the payment institution.

Figure 9:
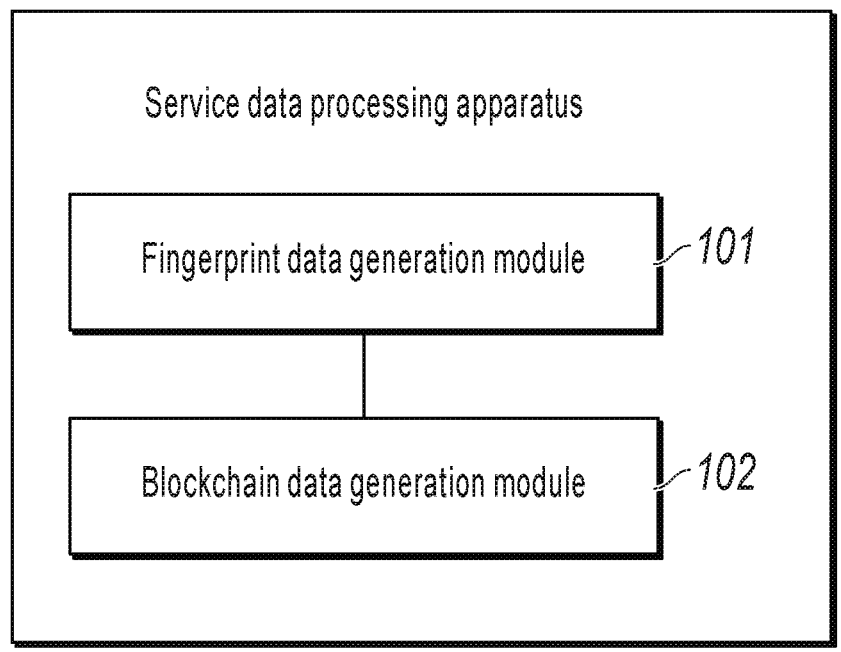
FIG. 9 is a schematic diagram illustrating a module structure in an implementation of an apparatus for service data processing, according to the present application.

Based on the method for service data processing described in the previous implementation of the present application, the present application further provides an apparatus for service data processing. FIG. 9 is a schematic diagram illustrating a module structure in an implementation of an apparatus for service data processing, according to the present application. As shown in FIG. 9, the apparatus can include: a fingerprint data generation module 101, configured to obtain service data that is to be processed, and generate, by using a predetermined method, fingerprint data of the service data that is to be processed; and a blockchain data generation module 102, configured to write the fingerprint data to a blockchain corresponding to the service data that is to be processed, and generate blockchain copy data of the service data that is to be processed in the blockchain, where the blockchain copy data stores fingerprint data in blockchain copy data of a previous adjacent node.

According to the apparatus for service data processing provided in the present application, when service data is stored, fingerprint data of the service data is calculated, and the fingerprint data is written to a blockchain. As such, it is equivalent to that there are different versions of the same document in both an existing database and the blockchain, and the two versions are anchored to each other. Therefore, a feature that the fingerprint data in the blockchain cannot be tampered with can be used to determine, in an associated way, whether data in the database is tampered with.

Figure 10:
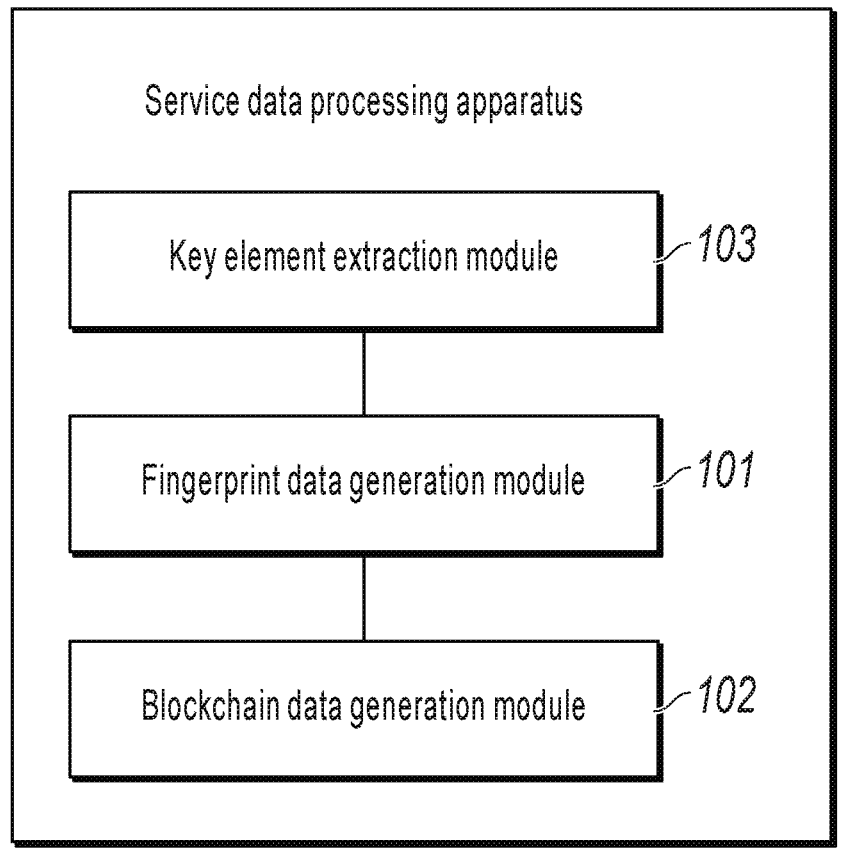
FIG. 10 is a schematic diagram illustrating a module structure in another implementation of an apparatus for service data processing, according to the present application.

FIG. 10 is a schematic diagram illustrating a module structure in another implementation of an apparatus for service data processing, according to the present application. As shown in FIG. 10, the apparatus can further include: a key element extraction module 103, configured to extract key element data of a predetermined type from the service data that is to be processed.

Correspondingly, the fingerprint data generation module 101 generates, by using a predetermined method, fingerprint data of the service data that is to be processed, including the following: processing the extracted key element data by using the predetermined method, to generate the fingerprint data of the service data that is to be processed.

Certainly, as described in the previous method implementation, in some implementations of the apparatus, a process of generating the fingerprint data by the fingerprint data generation module 101 can be set to be unidirectional and irreversible. In addition, the fingerprint data generation module 101 generates, by using a predetermined method, fingerprint data of the service data that is to be processed, including the following: performing hash processing on the service data that is to be processed, and using a hash value generated through the hash processing as the fingerprint data of the service data that is to be processed. Furthermore, in another implementation of the apparatus, the blockchain data generation module 102 can write, by using an asynchronous method, the fingerprint data to the blockchain corresponding to the service data that is to be processed.

Figure 11:
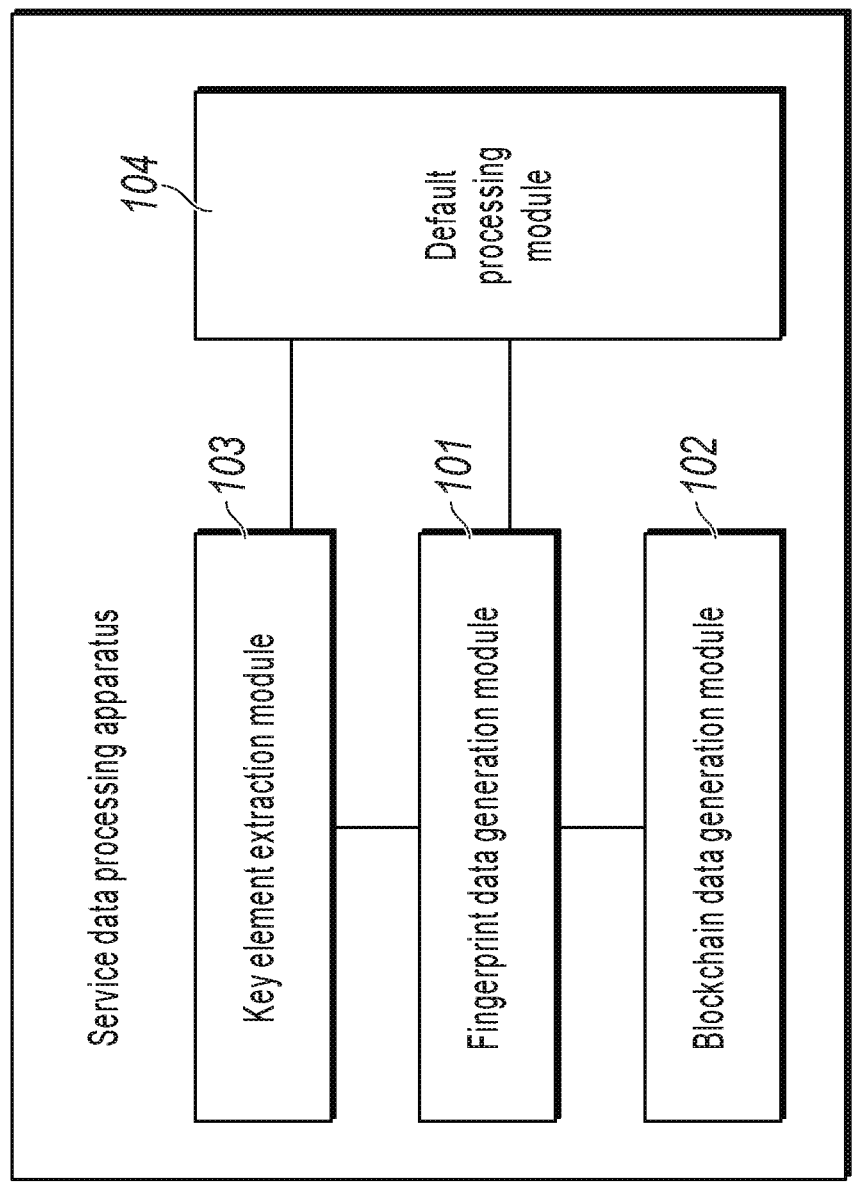
FIG. 11 is a schematic diagram illustrating a module structure in another implementation of an apparatus for service data processing, according to the present application.

FIG. 11 is a schematic diagram illustrating a module structure in another implementation of an apparatus for service data processing, according to the present application. As shown in FIG. 11, the apparatus can further include: a default processing module 104, configured to determine a default value of the key element data that is absent based on a service type of the service data when at least one piece of the key element data is absent from the service data that is to be processed, and use the default value as a value of the key element data for generating the fingerprint data.

According to the apparatus for service data processing provided in the present application, a blockchain is used to store a copy of data in a conventional service database. In a processing procedure of an original service system, only fingerprint data corresponding to service data needs to be generated, and the fingerprint data is then stored in a corresponding blockchain to generate blockchain copy data. As such, the processing procedure of the original service system is slightly invaded, and while it is ensured that the conventional database has a high-performance capability, a monitoring effect of the service data is ensured, and the service data cannot be modified, thereby improving reliability and credibility of the service data.

Figure 12:
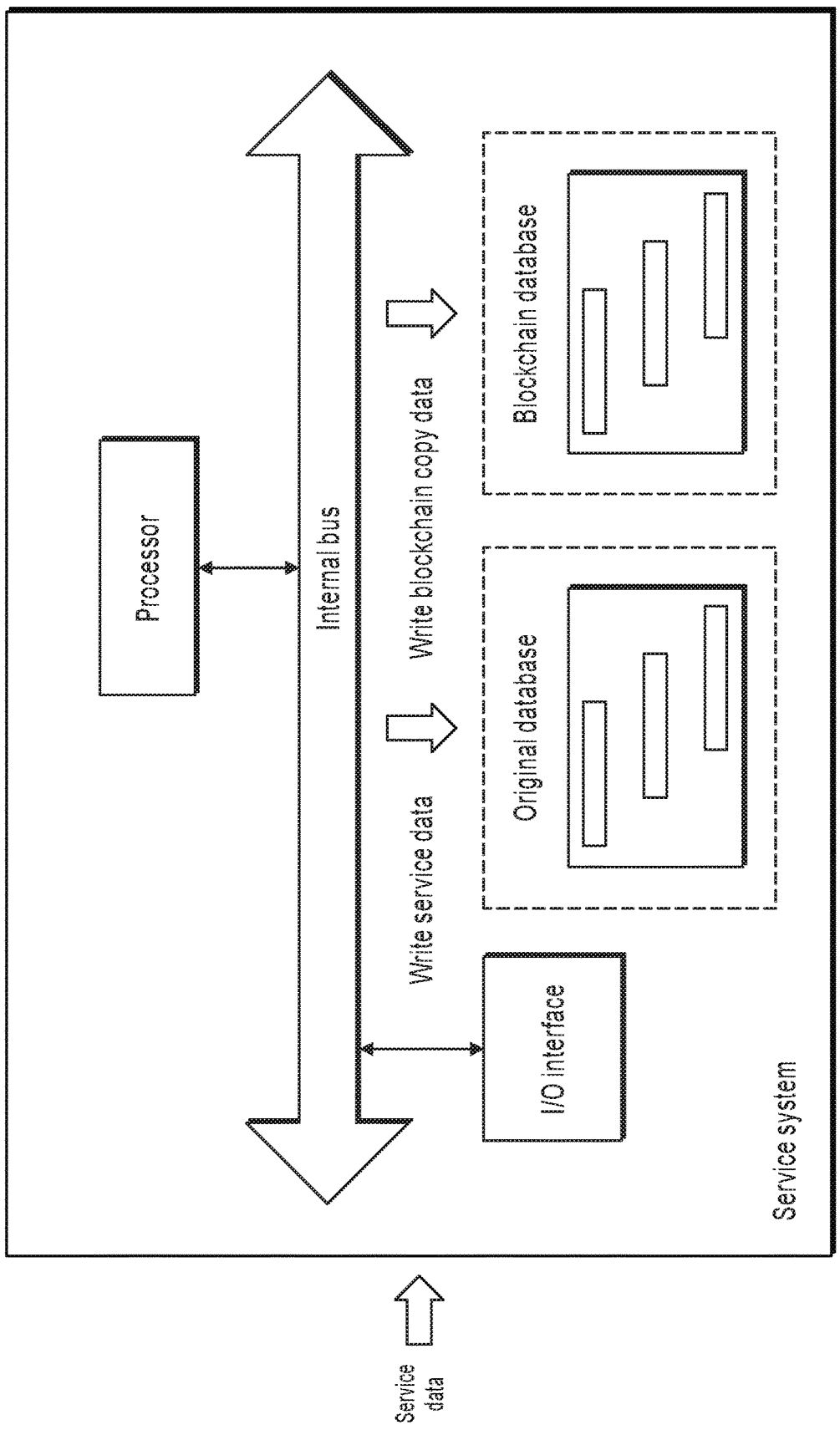
FIG. 12 is a schematic structural diagram illustrating an implementation of a service system, according to the present application.

The method/apparatus for service data processing and verification, etc. described in the previous implementations can be applied to another service system that includes a payment institution, to use a blockchain to store a copy of service data to improve credibility of the service data and reduce change/invasion to an original service system. FIG. 12 is a schematic structural diagram illustrating an implementation of a service system, according to the present application. The present application provides a service system, and the service system can include an I/O interface and a processing unit.

The I/O interface is configured to receive service data that is to be processed.

The processing unit is configured to generate, by using a predetermined method, fingerprint data of the service data that is to be processed; and is further configured to write the service data to an original database, write the fingerprint data to a blockchain database corresponding to the service data that is to be processed, and generate blockchain copy data of the service data that is to be processed in the blockchain, where the blockchain copy data stores fingerprint data in blockchain copy data of a previous adjacent node.

In an implementation, the original database that stores a service data set of the service system and the blockchain database that stores blockchain can be separated from the service system, and separately store data. In another implementation, any one of the original database and the blockchain database can be included in the service system. For example, in an implementation, the service system can include the original database of the service system, and the blockchain database can be separately disposed in a service server, a server of a third party, or a storage apparatus.

The processing unit can be further configured to extract key element data of a predetermined type from the service data that is to be processed; and correspondingly, the generating, by using a predetermined method, fingerprint data of the service data that is to be processed includes the following: processing the extracted key element data by using the predetermined method, to generate the fingerprint data of the service data that is to be processed.

The processing unit can be further configured to obtain, from stored blockchain data, blockchain copy data associated with service data that is to be verified, calculate, by using a predetermined method, first fingerprint data of the service data that is to be verified, and obtain second fingerprint data in the blockchain copy data that is corresponding to the service data that is to be verified; and can be further configured to determine, through comparison, whether the first fingerprint data is the same as the second fingerprint data, and determine that the service data that is to be verified is not modified if the first fingerprint data is the same as the second fingerprint data.

According to the method, apparatus, and system for service data processing and verification provided in the present application, a blockchain is used to store a copy of data in a conventional service database. In a processing procedure of an original service system, only fingerprint data corresponding to service data needs to be generated, and the fingerprint data is then stored in a corresponding blockchain to generate blockchain copy data. As such, the processing procedure of the original service system is slightly invaded, and while it is ensured that the conventional database has a high-performance capability, a monitoring effect of the service data is ensured, and the service data cannot be modified, thereby improving reliability and credibility of the service data.

Although the schematic diagram format of the blockchain, the definition and the extraction method of the key element data, generating the fingerprint data by using MD5, comparing the fingerprint data of the service data in the database and the blockchain to determine whether the service data is tampered with, data definition, acquisition, interaction, calculation, determining, etc. are mentioned in the content of the present application, the present application is not limited to complying with an industry communication standard, a standard data structure, a standard database data processing method or situations described in the implementations of the present application. An implementation solution obtained by using some industry standards, or in a self-defined way, or by slightly modifying the implementation described in the implementations can also achieve an implementation effect the same as, equivalent to, or similar to that achieved in the previous implementations, or an expected implementation effect obtained after transformation. An implementation that is obtained by applying a modified or transformed data acquisition, storage, determining, and processing method can still fall within an optional implementation solution range of the present application.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer independently performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The logic compiler software is similar to a software compiler used to develop and write a program, and the original code needs to be written in a particular programming language for compilation referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be, for example, a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicon Labs C8051F320. The memory controller can also be implemented as a part of control logic of a memory. A person skilled in the art should also know that in addition to implementing the controller by using the computer readable program code, logic programming can be performed on the method steps to allow the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, an in-vehicle human-machine interaction device, a cellular phone, a camera phone, a smartphone, a personal digital assistant, a media player, a navigation device, an email device, a game console, a tablet computer, a wearable device, or any combination of these devices.

Although the method operation steps in the implementations or the flowcharts are provided in the present application, more or fewer operation steps can be included based on conventional or noncreative means. The sequence of the steps listed in the implementations is merely one of numerous step execution sequences, and does not represent the unique execution sequence. For an actual apparatus or end-user device product, the steps can be performed based on the method sequence in the implementations or the accompanying drawings or performed in parallel (for example, an environment of parallel processing or multi-threaded processing, or even a distributed data processing environment). Terms "include", "contain", or their any other variant is intended to cover non-exclusive inclusion, so that a process, a method, a product, or a device that includes a series of elements not only includes these elements, but also includes other elements that are not expressly listed, or further includes elements inherent to such a process, method, product, or device. An element described by "includes a . . . " further includes, without more constraints, another same or identical element in the process, method, product, or device that includes the element.

For ease of description, the previous apparatus is described by dividing the functions into various modules. Certainly, when the present application is implemented, functions of various modules can be implemented in one or more pieces of software and/or hardware, modules that implement the same function can be implemented by using a combination of a plurality of submodules or subunits, etc. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art should also know that in addition to implementing the controller by using the computer readable program code, logic programming can be performed on the method steps to allow the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The present disclosure is described with reference to the flowcharts and/or block diagrams of the method, the device (system), and the computer program product in the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that an apparatus for implementing a specific function in one or more processes in the flowcharts and/or in one or more blocks in the block diagrams can be generated by using the instructions executed by the computer or the processor of the another programmable data processing device.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application can be described in the general context of computer-executable instructions, for example, a program module. Generally, the program module includes a routine, a program, an object, a component, a data structure, etc. executing a specific task or implementing a specific abstract data type. The present application can alternatively be practiced in distributed computing environments where tasks are performed by remote processing devices that are connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from the other implementations. Especially, a system implementation is basically similar to the method implementations, and therefore is described briefly. For related parts, references can be made to partial descriptions in the method implementations.

The previous descriptions are merely implementations of the present application, and are not intended to limit the present application. For a person skilled in the art, the present application can have various changes and variations. Any modifications, equivalent substitutions, and improvements made within the spirit and the principle of the present application shall fall within the scope of the claims of the present application.

Figure 13:
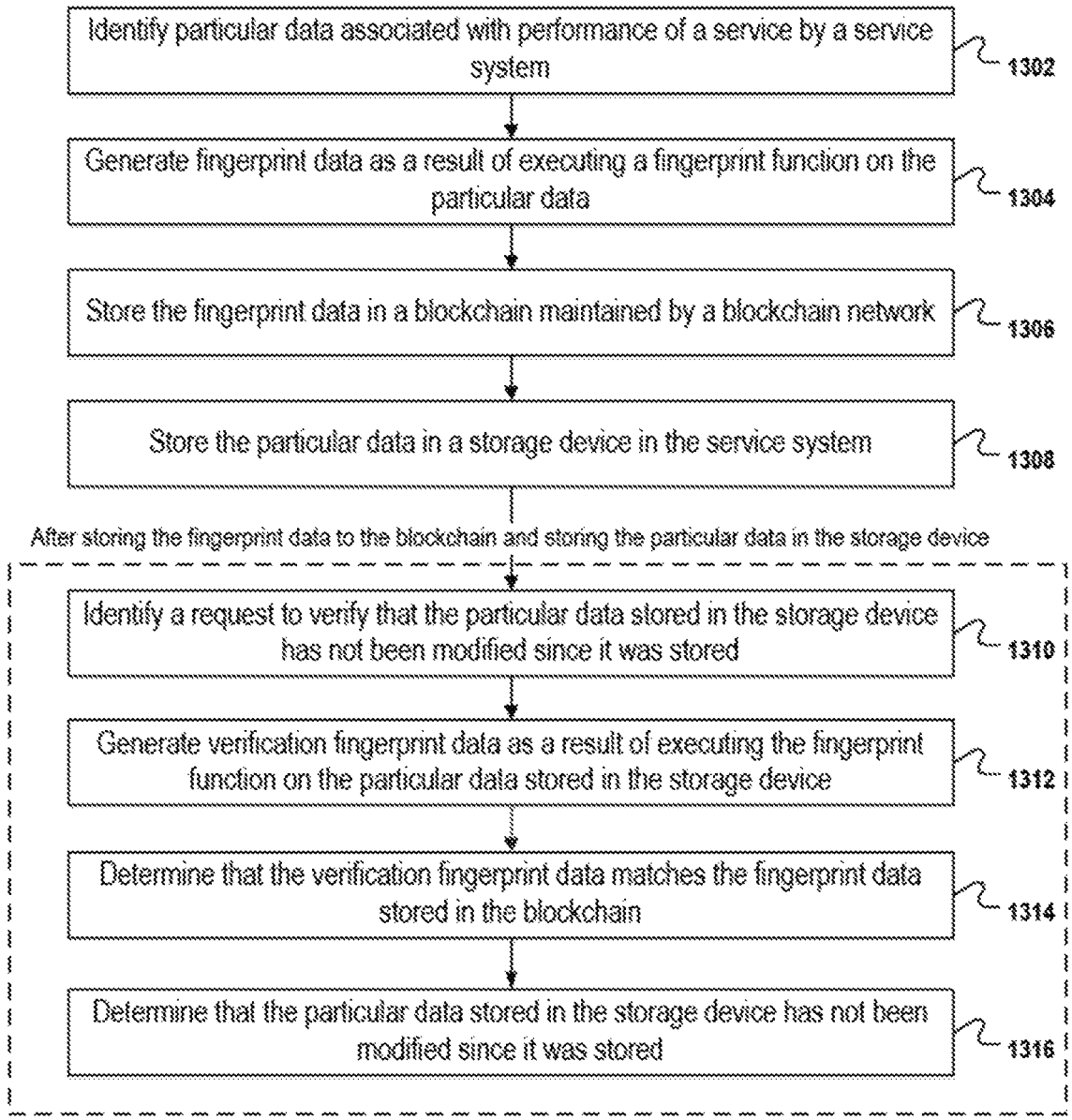
FIG. 13 is a flowchart illustrating an example of a computer-implemented method for detecting data tampering, according to an implementation of the present disclosure.

FIG. 13 is a flowchart illustrating an example of a computer-implemented method 1300 for detecting data tampering, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

At 1302, particular data associated with performance of a service by a service system is identified. In some implementations, the service system is an accounting system, and the particular data is accounting data At 1304, fingerprint data is generated as a result of executing a fingerprint function on the particular data, wherein the fingerprint function is configured to always produce the fingerprint data when executed on the particular data, and wherein the fingerprint function is configured to always produce different fingerprint data when executed on data different from the particular data. In some cases, the fingerprint function is configured to be unidirectional and irreversible. In some implementations, the fingerprint function includes a hash function, and the fingerprint data is a hash value associated with the particular data. In some cases, the hash function is a customized hash function specific to at least one of the service system or a type of the particular data. In some cases, after identifying the particular data, key element data of a predetermined type is extracted from the particular data, wherein the fingerprint function is configured to process the key element data to generate the fingerprint data.

At 1306, the fingerprint data is stored in a blockchain maintained by a blockchain network. In some cases, storing the fingerprint data in the blockchain is performed using an asynchronous method. At 1308, the particular data is stored in a storage device in the service system;

The remaining actions of the method 1300 are performed after storing the fingerprint data to the blockchain and storing the particular data in the storage device (at 1308). At 1310, a request to verify that the particular data stored in the storage device has not been modified since it was stored is identified. At 1312, verification fingerprint data is generated as a result of executing the fingerprint function on the particular data stored in the storage device. At 1314, a determination is made that the verification fingerprint data matches the fingerprint data stored in the blockchain. At 1316, in response to determining that the verification fingerprint data matches, it is determined that the particular data stored in the storage device has not been modified since it was stored.

In some implementations, the particular data is first data, the request is a first request, the verification fingerprint data is first verification fingerprint data, the fingerprint data is first fingerprint data, the method 1300 includes identifying a second request to verify that second data stored in the storage device has not been modified since it was stored; generating second verification fingerprint data as a result of executing the fingerprint function on the second data stored in the storage device; determining that the second verification fingerprint data does not match second fingerprint data stored in the blockchain and associated with second data; and in response to determining that the second verification fingerprint data does not match, determining that the second data stored in the storage device has been modified since it was stored.

The techniques described in this specification produce one or more technical effects. In some implementations, the techniques produce the effect of increased security in the service system by allowing the detection of tampering with data associated with the service. For example, in an accounting system, if a malicious actor changed a value in accounting record stored in the accounting system, this tampering would be identified by comparing the fingerprint data stored in the blockchain with fingerprint data generated based on the modified data. Because the two sets of fingerprint data would not match, the tampering would be detected and action could be taken. In some cases, the techniques also provide increased security by only storing the fingerprint data in the blockchain instead of the actual service data. Because the service data may be sensitive or private data specific to the service system, publishing the data itself in a blockchain, which may be publically accessible, presents a security problem. However, storing only the fingerprint data of the service data can alleviate this issue, because the service data cannot be derived from the fingerprint data alone.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for detecting data tampering, comprising:
    identifying particular data associated with performance of a service by a service system;
    extracting, from the particular data, pieces of key element data having respective predetermined types;
    determining whether at least one piece of key element data is absent from the identified particular data;
    in response to determining that at least one piece of the key element data is absent from the identified particular data, determining a default value of the piece of key element data that is absent based on a service type of the particular data;
    generating fingerprint data as a result of executing a fingerprint function on the pieces of key element data and at least by using the default value as a value of the piece of key element data that is absent, wherein the fingerprint function is configured to always produce the fingerprint data when executed on the particular data, and wherein the fingerprint function is configured to always produce different fingerprint data when executed on data different from the particular data;
    storing the fingerprint data in a blockchain maintained by a blockchain network;
    after storing the fingerprint data in the blockchain, storing the particular data in a storage device in the service system;
    after storing the fingerprint data in the blockchain and storing the particular data in the storage device:
        generating verification fingerprint data as a result of executing the fingerprint function on the particular data stored in the storage device;
        determining that the verification fingerprint data matches the fingerprint data stored in the blockchain; and
        in response to determining that the verification fingerprint data matches, determining that the particular data stored in the storage device has not been modified since it was stored.

2. The computer-implemented method of claim 1, wherein the fingerprint function is configured to be unidirectional and irreversible.

3. The computer-implemented method of claim 1, wherein the fingerprint function includes a hash function, and wherein the fingerprint data is a hash value associated with the particular data.

4. The computer-implemented method of claim 3, wherein the hash function is a customized hash function specific to at least one of the service system or a type of the particular data.

5. The computer-implemented method of claim 1, wherein storing the fingerprint data in the blockchain is performed using an asynchronous method.

6. The computer-implemented method of claim 1, wherein the service system is an accounting system, and wherein the particular data is accounting data.

7. The computer-implemented method of claim 1, further comprising:
    before generating the verification fingerprint data, identifying a request to verify that the particular data stored in the storage device has not been modified since it was stored.

8. The computer-implemented method of claim 7, wherein the particular data is first data, the request is a first request, the verification fingerprint data is first verification fingerprint data, the fingerprint data is first fingerprint data, the method further comprising:
    identifying a second request to verify that second data stored in the storage device has not been modified since it was stored;
    generating second verification fingerprint data as a result of executing the fingerprint function on the second data stored in the storage device;
    determining that the second verification fingerprint data does not match second fingerprint data stored in the blockchain and associated with second data; and
    in response to determining that the second verification fingerprint data does not match, determining that the second data stored in the storage device has been modified since it was stored.

9. A non-transitory, computer-readable medium storing one or more instructions executable by a computer system to perform operations comprising:
    identifying particular data associated with performance of a service by a service system;
    extracting, from the particular data, pieces of key element data having respective predetermined types;
    determining whether at least one piece of key element data is absent from the identified particular data;
    in response to determining that at least one piece of the key element data is absent from the identified particular data, determining a default value of the piece of key element data that is absent based on a service type of the particular data;
    generating fingerprint data as a result of executing a fingerprint function on the pieces of key element data and at least by using the default value as a value of the piece of key element data that is absent, wherein the fingerprint function is configured to always produce the fingerprint data when executed on the particular data, and wherein the fingerprint function is configured to always produce different fingerprint data when executed on data different from the particular data;
    storing the fingerprint data in a blockchain maintained by a blockchain network;
    after storing the fingerprint data in the blockchain, storing the particular data in a storage device in the service system;

after storing the fingerprint data in the blockchain and storing the particular data in the storage device:
generating verification fingerprint data as a result of executing the fingerprint function on the particular data stored in the storage device;
determining that the verification fingerprint data matches the fingerprint data stored in the blockchain; and
in response to determining that the verification fingerprint data matches, determining that the particular data stored in the storage device has not been modified since it was stored.

10. The non-transitory, computer-readable medium of claim 9, wherein the fingerprint function is configured to be unidirectional and irreversible.

11. The non-transitory, computer-readable medium of claim 9, wherein the fingerprint function includes a hash function, and wherein the fingerprint data is a hash value associated with the particular data.

12. The non-transitory, computer-readable medium of claim 11, wherein the hash function is a customized hash function specific to at least one of the service system or a type of the particular data.

13. The non-transitory, computer-readable medium of claim 9, wherein storing the fingerprint data in the blockchain is performed using an asynchronous method.

14. The non-transitory, computer-readable medium of claim 9, wherein the service system is an accounting system, and wherein the particular data is accounting data.

15. The non-transitory, computer-readable medium of claim 9, the operations further comprising:
before generating the verification fingerprint data, identifying a request to verify that the particular data stored in the storage device has not been modified since it was stored.

16. The non-transitory, computer-readable medium of claim 15, wherein the particular data is first data, the request is a first request, the verification fingerprint data is first verification fingerprint data, the fingerprint data is first fingerprint data, the operations further comprising:
identifying a second request to verify that second data stored in the storage device has not been modified since it was stored;
generating second verification fingerprint data as a result of executing the fingerprint function on the second data stored in the storage device;
determining that the second verification fingerprint data does not match second fingerprint data stored in the blockchain and associated with second data; and
in response to determining that the second verification fingerprint data does not match, determining that the second data stored in the storage device has been modified since it was stored.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
identifying particular data associated with performance of a service by a service system;
extracting, from the particular data, pieces of key element data having respective predetermined types;
determining whether at least one piece of key element data is absent from the identified particular data;
in response to determining that at least one piece of the key element data is absent from the identified particular data, determining a default value of the piece of key element data that is absent based on a service type of the particular data;
generating fingerprint data as a result of executing a fingerprint function on the pieces of key element data and at least by using the default value as a value of the piece of key element data that is absent, wherein the fingerprint function is configured to always produce the fingerprint data when executed on the particular data, and wherein the fingerprint function is configured to always produce different fingerprint data when executed on data different from the particular data;
storing the fingerprint data in a blockchain maintained by a blockchain network;
after storing the fingerprint data in the blockchain, storing the particular data in a storage device in the service system;
after storing the fingerprint data in the blockchain and storing the particular data in the storage device:
generating verification fingerprint data as a result of executing the fingerprint function on the particular data stored in the storage device;
determining that the verification fingerprint data matches the fingerprint data stored in the blockchain; and
in response to determining that the verification fingerprint data matches, determining that the particular data stored in the storage device has not been modified since it was stored.

* * * * *